(12) United States Patent
Vu et al.

(10) Patent No.: US 8,386,724 B2
(45) Date of Patent: Feb. 26, 2013

(54) METHODS AND APPARATUS FOR DESIGNATING OR USING DATA STATUS INDICATORS

(75) Inventors: Luyen Vu, San Jose, CA (US); Uday Chandrasekhar, San Jose, CA (US); Dean Nobunaga, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 686 days.

(21) Appl. No.: 12/389,105

(22) Filed: Feb. 19, 2009

(65) Prior Publication Data
US 2010/0211733 A1   Aug. 19, 2010

(51) Int. Cl.
*G06F 13/00* (2006.01)
(52) U.S. Cl. ......................................... 711/154; 711/103
(58) Field of Classification Search ................... 711/103, 711/114, 156
See application file for complete search history.

(56) References Cited

U.S. PATENT DOCUMENTS

| 5,555,382 A * | 9/1996 | Thaller et al. .................. 710/113 |
| 2004/0186863 A1* | 9/2004 | Garthwaite .................... 707/206 |
| 2005/0226046 A1* | 10/2005 | Lee et al. .................. 365/185.12 |
| 2007/0041234 A1* | 2/2007 | Nishihara et al. ............. 365/145 |
| 2009/0019215 A1* | 1/2009 | Lee et al. ....................... 711/103 |
| 2009/0132760 A1* | 5/2009 | Flynn et al. .................... 711/113 |

OTHER PUBLICATIONS

Texas Instruments "8-Bit Parallel-Out Serial Shift Register" SN74ALS164A—Apr. 1982—Revised Dec. 1994 pp. 1-5.

* cited by examiner

*Primary Examiner* — Reba I Elmore
(74) *Attorney, Agent, or Firm* — Leffert Jay & Polglaze, P.A.

(57) ABSTRACT

Memory devices and methods facilitate handling of data received by a memory device through the use of data grouping and assignment of data validity status values to grouped data. For example, data is received and delineated into one or more data groups and a data validity status is associated with each data group. Data groups having a valid status are latched into one or more cache registers for storage in an array of memory cells wherein data groups comprising an invalid status are rejected by the one or more cache registers.

26 Claims, 5 Drawing Sheets

METHODS AND APPARATUS FOR DESIGNATING OR USING DATA STATUS INDICATORS

TECHNICAL FIELD

The present disclosure relates generally to electronic devices and in particular the present disclosure relates to methods and apparatus for data handling in a memory device.

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Non-volatile memory is memory that can retain its stored data for some extended period without the application of power. Common uses for flash memory and other non-volatile memory include personal computers, personal digital assistants (PDAs), digital cameras, digital media players, digital recorders, games, appliances, vehicles, wireless devices, mobile telephones and removable memory modules, and the uses for non-volatile memory continue to expand.

Flash memory devices typically use a one-transistor memory cell that allows for high memory densities, high reliability, and low power consumption. Storing data in a flash memory cell can be accomplished by changing the threshold voltage of the cell, through programming or "writing" of charge storage nodes, such as floating gates or trapping layers or other physical phenomena. By defining two or more ranges of threshold voltages to correspond to individual data states, one or more bits of information may be stored on each cell. Examples are single level and multilevel memory cells.

Flash memory typically utilizes one of two basic architectures known as NOR flash and NAND flash. The designation is derived from the logic used to read the devices. In a NOR flash architecture, a column of memory cells are coupled in parallel with each memory cell coupled to a transfer line, often referred to as a bit line. In a NAND flash architecture, a column (e.g., NAND string) of memory cells are coupled in series with only the first memory cell of the column coupled to a bit line.

Memory devices are typically coupled to other electronic devices, such as a host by way of a communications bus. In such configurations, the host and/or other electronic devices (e.g., peripheral devices) coupled to the communications bus can provide data to the memory device for storage of the data in the memory device. The memory device may also provide data to the communications bus in response to a request by the host and/or peripheral device for data stored in the memory device. One aspect of technology that continues to increase is the communications bus speeds (e.g., throughput) of communications busses. For example, communications bus speeds into the gigahertz range are currently in use and communications bus speeds continue to increase. As communications bus speeds continue to increase, a bottleneck can exist at the memory device with regard to how fast the memory device can accept and store data and/or how fast the memory device can respond to a request to transmit data stored in the memory device. Thus, a host may be required to slow and/or halt data transmission on the communications bus while it waits for the memory device to complete a data storage operation, for example.

Thus, for the reasons stated above, and for other reasons that will become apparent to those skilled in the art upon reading and understanding the present specification, there is a need in the art for alternate methods of performing data handling operations in a memory device.

DETAILED DESCRIPTION

In the following detailed description of the present embodiments, reference is made to the accompanying drawings that form a part hereof, and in which is shown by way of illustration specific embodiments in which the disclosure may be practiced. These embodiments are described in sufficient detail to enable those skilled in the art to practice the embodiments of the invention, and it is to be understood that other embodiments may be utilized and that electrical, mechanical or process changes may be made without departing from the present disclosure. The following detailed description is, therefore, not to be taken in a limiting sense.

Figure 1:
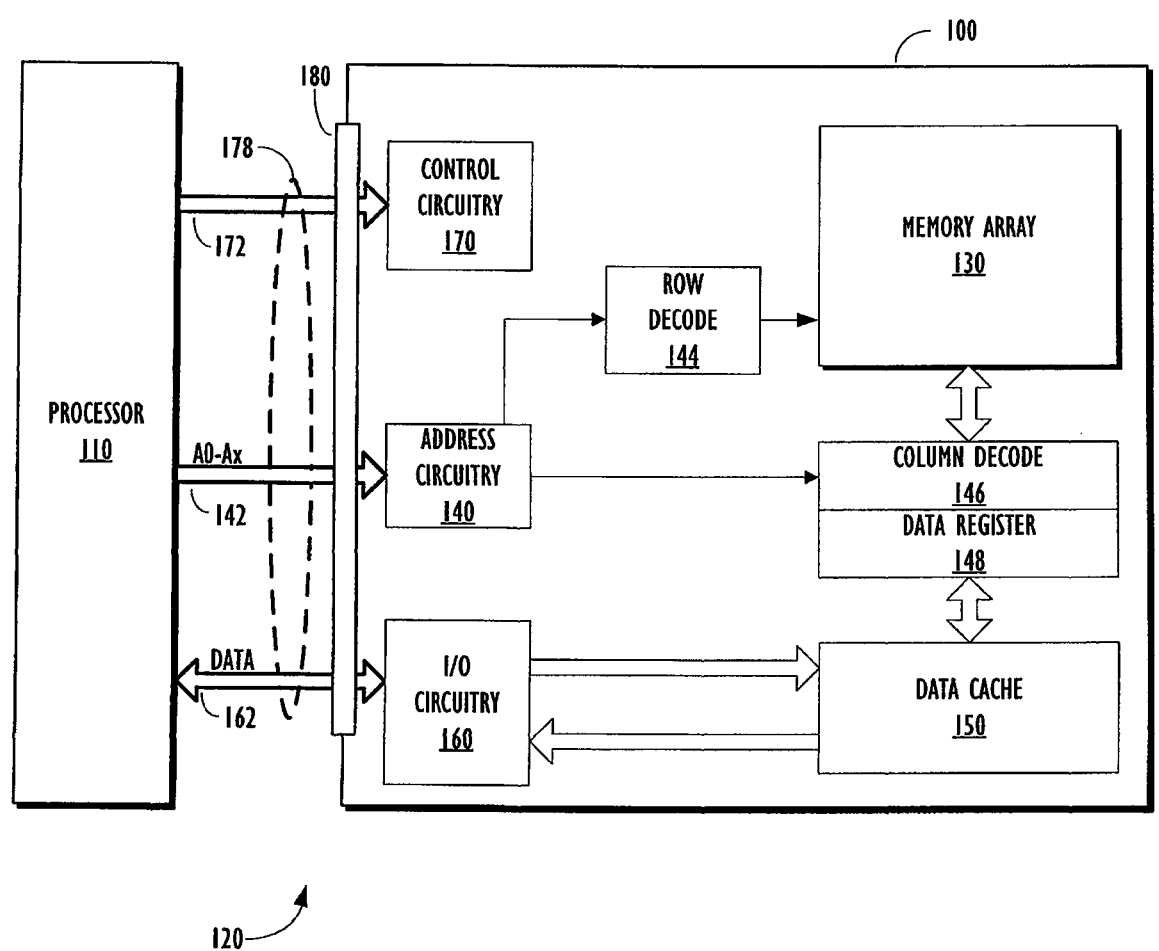
FIG. 1 is a functional block diagram of a typical electronic system comprising at least one memory device.

FIG. 1 illustrates a typical memory device 100 coupled to a host, such as processor 110, by a communications bus 178 thus forming a system 120. Memory devices, along with many other types of peripheral devices, are typically coupled to a host and/or other devices in a system through various types of communications busses. These communications busses allow for the transfer of information between the devices, such as various commands and data, for example. These communications busses comprise one or more communications channels. Various types of communications busses are known to those skilled in the art. For example, a serial communications bus typically consists of a single communications channel capable of sending and/or receiving a single data stream of data (e.g., bits). Another typical communications bus configuration is a parallel communications bus. A parallel communications bus consists of two or more communications channels configured to send and/or receive a stream of data down each channel of the parallel communications bus. The data streams of parallel communications busses are typically synchronized with each other both in timing and in direction. Both serial and parallel communications bus configurations might be configured as unidirectional (e.g., one-way) and/or bi-directional (e.g., two-way) communications busses. The communications bus 178 shown in FIG. 1 is illustrated as having separate control signals 172, address signals 142 and data signals 162 coupled to the memory device through an interface 180. However, as discussed above, many types of communications bus configurations exist and are known to those skilled in the art. It should be noted that various configurations of communications bus 178 can be used. For example, control signals 172 might be discrete control signals such as Address Latch Enable (ALE), Command Latch Enable (CLE), data strobe (DQS) and a clock signal (CLK). Other control signals are known to those skilled in the art. Address signals 142 may also be combined with the data signals 162 to form a communications bus capable of carrying both address and data information over the same communications channels, for example. Additional communications busses might transmit the control signals 172, address signals 142 and data signals 162 over a single communications channel, such as over a serial communications bus, for example.

The memory device 100 includes an array of memory cells 130 that can be logically arranged in banks of rows and columns. For example, the memory array can be an array of flash memory cells arranged in a NAND or NOR configuration.

Row decode circuitry 144 and column decode circuitry 146 are provided to decode address signals. Address signals 142 are received and decoded to access memory array 130. Memory device 100 also includes input/output (I/O) control circuitry 160 to manage input of commands, addresses and data to the memory device 100 as well as output of data and status information from the memory device 100. An address register 140 is coupled between the address communications bus 142, row decode circuitry 144 and column decode circuitry 146 to latch the address signals prior to decoding. Control logic 170 controls access to the memory array 130 in response to commands and generates status information for the external processor 110. The control logic 170 is coupled (not shown) to row decode circuitry 144 and column decode circuitry 146 to control the row decode circuitry 144 and column decode circuitry 146 in response to decoded address signals. Control logic 170 can include a state machine and/or various logic circuits and control registers.

Control logic 170 is also coupled (not shown) to a data cache 150. Data cache 150 latches data, either incoming or outgoing, as directed by control logic 170 to temporarily store data while the memory array 130 is busy writing or reading other data. During a write operation, data is passed from the data cache 150 to data register 148 for transfer to the memory array 130; then new data is latched in the data cache 150 from the I/O control circuitry 160. During a read operation, data is passed from the data cache 150 to the I/O control circuitry 160 for output to the processor 110; then new data read from the array 130 is passed from the data register 148 to the data cache 150.

It should be noted that FIG. 1 has been simplified and that additional circuitry and signals can be provided as are known to those skilled in the art.

Figure 2:
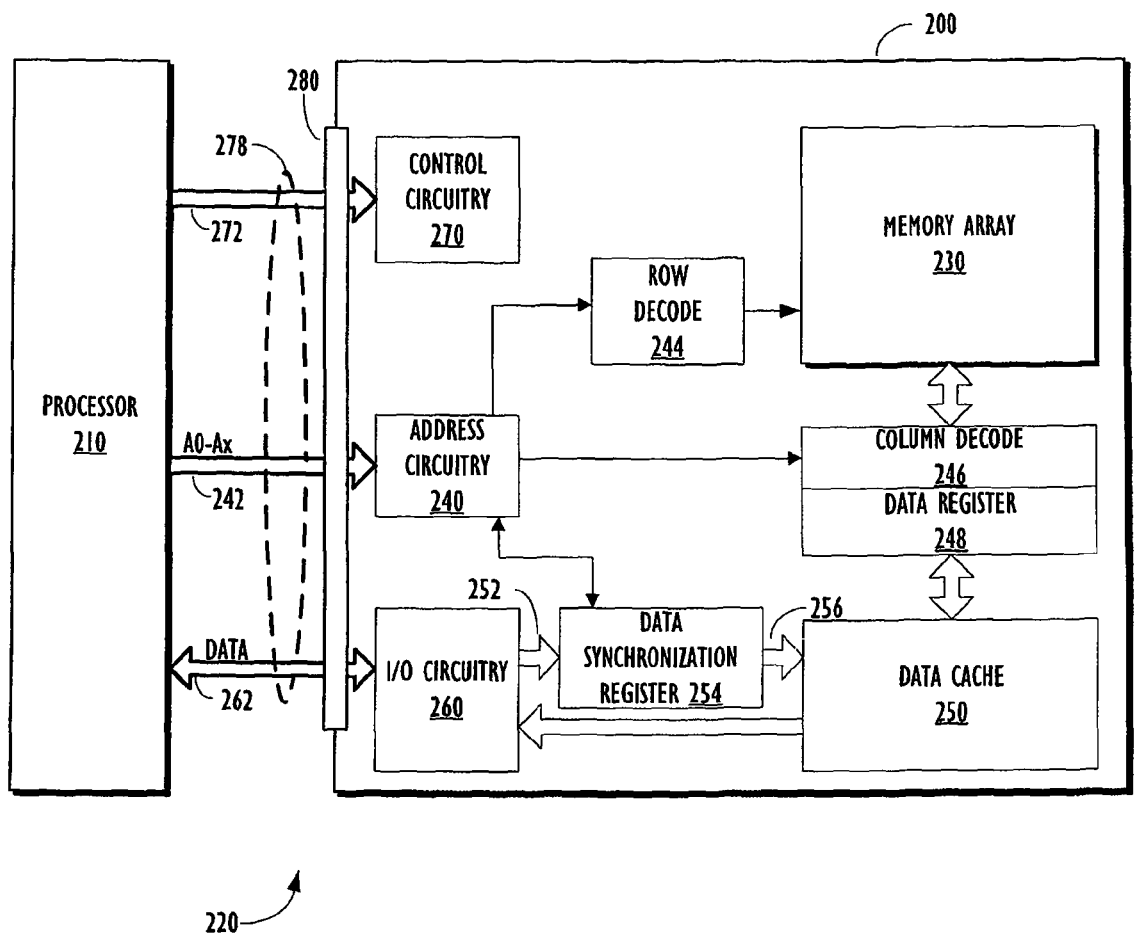
FIG. 2 is a functional block diagram of an electronic system comprising at least one memory device according to an embodiment of the present disclosure.

FIG. 2 illustrates a system 220 comprising a memory device 200 according to one or more embodiments of the present disclosure coupled to a processor 210, by a communications bus 278. The memory device 200 is shown incorporating a Data Synchronization Register (DSR) 254 according to one or more embodiments of the present disclosure. The DSR 254 is configured to receive data from the memory device interface, such as through the I/O circuitry 260 over a communications bus 252. Communications bus 252 might comprise a single channel (e.g., serial communications bus) or a plurality of channels (e.g., parallel communications bus). As an example, data presented on the communications bus 252 by the processor 210 for storage in the memory device 200 is received by the DSR 254. The DSR 254 is further shown coupled to and is configured to interact with the address circuitry 240. The DSR 254 is also coupled to the data cache 250 by a data communications bus 256. According to one or more embodiments of the present disclosure, data bus 256 might be a 32 bit parallel data communications bus. Other bus widths for communications bus 256 are possible according to various embodiments of the present disclosure. DSR 254 might also be coupled (not shown) to control circuitry 270, for example. It should be noted that according to one or more embodiments of the present disclosure, I/O circuitry 260 and interface 280 might be combined.

It should be noted that FIG. 2 is shown in a simplified form to improve readability of the figure and to focus on elements which aid in the understanding of various embodiments of the present disclosure. Additional circuitry and functionality can be present as is known to those skilled in the art.

Figure 3:
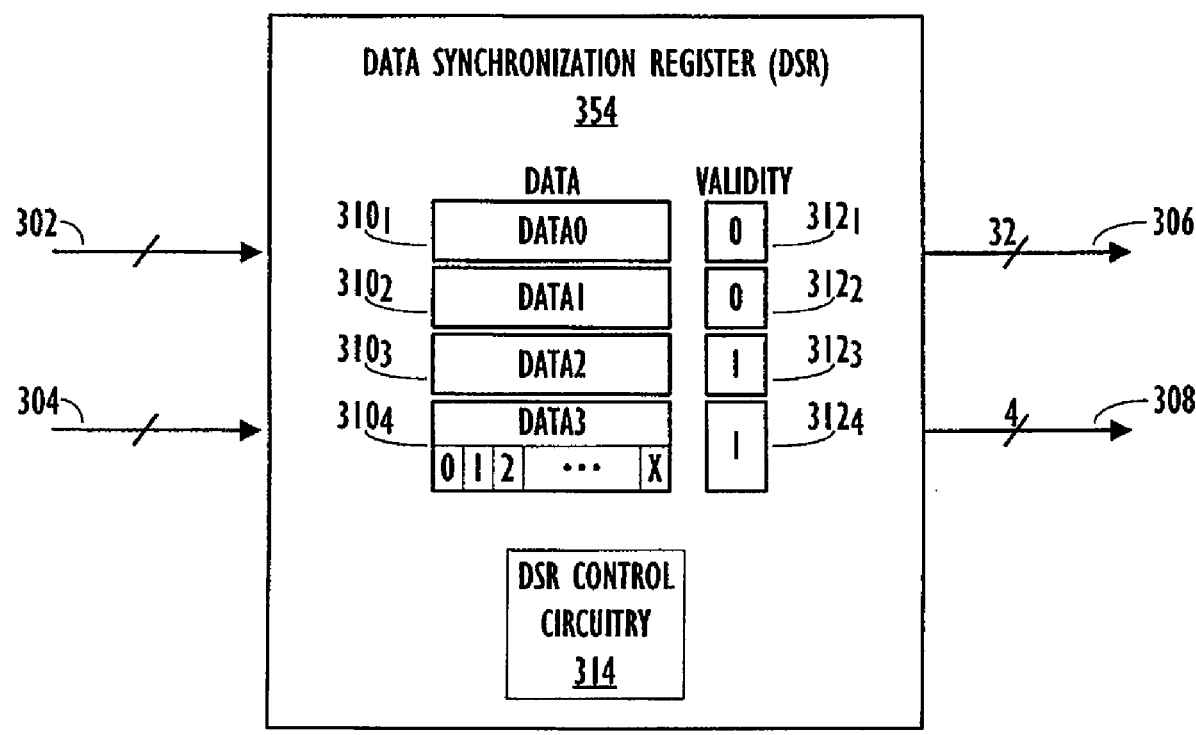
FIG. 3 is a functional block diagram of a data synchronization register according to an embodiment of the present disclosure.

FIG. 3 illustrates a simplified functional block diagram of a DSR 354, as one example of more detail for DSR 254, according to various embodiments of the present disclosure. Data is received at the DSR 354 by way of a data bus 302, such as a serial data bus, for example. According to one or more embodiments, DSR 354 might also receive one or more control signals 304, for example. These control signals 304 might comprise one or more signals which are interpreted by the DSR 354 and utilized in determining data that is to be designated as valid or invalid data inside the DSR 354. DSR 354 comprises one or more data registers 310 in which received data is captured by the DSR 354. Register Data3 $310_4$ illustrates additional detail and the arrangement of data (e.g., bits) within each of the data registers 310. For example, $310_4$ is illustrated as having bit positions within the Data3 register of <0, 1, 2, ... X>bits. According to at least one embodiment, the data registers 310 comprise registers configured to latch eight bits (e.g., <0, 1, 2, ... 7>) of data, for example. However, various embodiments are not limited to eight bits and might be configured to latch more or less than eight bits of data per register 310. The DSR 354 is shown as comprising four data registers (e.g., Data0-Data3) 310 for handling four bytes of data at a time, for example. However, various embodiments are not limited to four bytes and might be configured to handle more or less number of bytes than four at a given time. For example, various embodiments might comprise data registers 310 configured to latch one or more bits of data and DSRs 354 comprising one or more data registers 310.

In addition to registers configured to latch data 310, DSR 354 further comprises a number of registers 312 for storing information relating to the status (e.g., validity) of the data stored in each of the data registers 310. For example, information stored in $312_1$ corresponds to the validity of data stored in the Data0 $310_1$ register. The $312_2$ register stores information relating to the validity of data stored in data register Data1 $310_2$, and so on. The validity registers 312 according to one embodiment might store a single bit to indicate the validity of the data stored in the associated data register 310. For example, the 0 stored in validity registers $312_1$ and $312_2$ might indicate that the data stored in the associated data registers, $310_1$ and $310_2$, respectively, are storing data that has been determined to be invalid. The 1 stored as shown in FIG. 3 in each of the validity registers $312_3$ and $312_4$ might indicate that the data stored in their associated data registers $310_3$ and $310_4$ are storing valid data, for example. However, one or more embodiments are not limited to a 0 value being indicative of invalid data and a 1 value being indicative of valid data. Other bit values are possible according to various embodiments of the present disclosure. Further embodiments might store more than one bit of information (e.g., bit patterns) in the validity register 312 to indicate the validity status of the associated data registers 310, for example.

DSR 354 further comprises control circuitry 314. Control circuitry 314 is configured to manage operations inside the DSR 354, such as controlling the data registers 310 and the validity registers 312 according to various embodiments of the present disclosure, for example. Control circuitry 314 might also receive and interpret control signals received on control signal bus 304, for example. The control circuitry 314 may determine a validity status of data being received on the communications bus 302 and set the appropriate validity register to match the intended validity status of the received data, for example. The DSR control circuitry 314 might be configured to interpret multiple control signals present on the control signal bus 304 or might receive and/or interpret a single control signal of the control signal bus 304 when assigning the validity of data received at the data bus 302, for example.

During operation of a memory device according to one or more embodiments of the present disclosure, data might received by the DSR 354 over a serial communications bus 302, for example. The data received may have been provided by a host coupled to the memory device utilizing a DSR according to one or more embodiments of the present disclosure. As the received data is provided over a serial communications bus 302, the data is sequentially latched into the data registers Data0-Data3 310. For example, Data0 $310_1$ might latch the first eight bits of a 32 bit data stream, Data1 $310_2$ might latch the second eight bits of the 32 bit data stream, and so on until the data registers 310 have latched all 32 bits of the data stream provided on the serial communications bus 302. As data is being latched into a given data register 310, control signals 304 present at the DSR 354 indicate to the DSR 354 as to the intended validity of the data currently being latched. Thus, the DSR 354 interprets the control signals 304 and assigns a status (e.g., valid or invalid) by setting the validity register 312 associated with the data register 310 which is in the process of latching the data. According to the various embodiments, the DSR 354 might set the validity bit registers 312 prior to, during, or following the data being latched into the corresponding data register 310. Prior to receiving new data from the serial communications bus 302, the DSR 354 might clear all the validity registers (e.g., set to 0) to indicate an invalid status of the data registers 310. As the data collection process proceeds, if the DSR 354 determines that data being latched into a particular data latch 310 is to be assigned a valid status based on the control signals 304, the DSR 354 will set the validity register bit 312 corresponding to the data register 310 to a value of 1, for example.

Figure 4A:
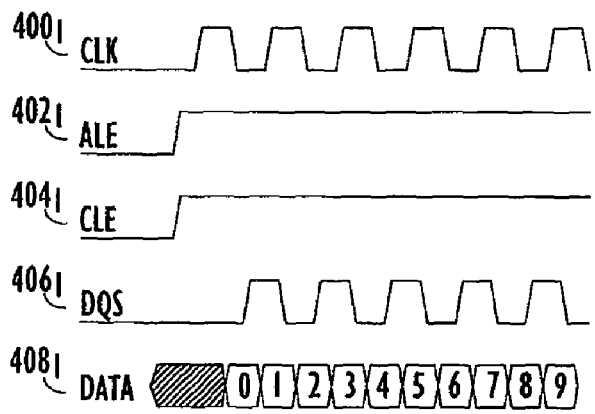
FIGS. 4A-4C are timing diagrams illustrating signal waveforms comporting with an embodiment of the present disclosure.
Figure 4B:
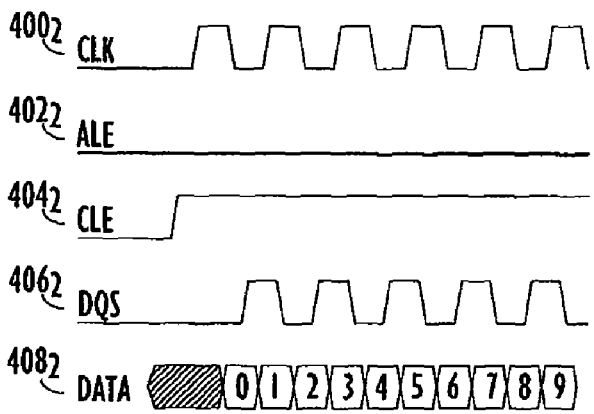
Figure 4C:
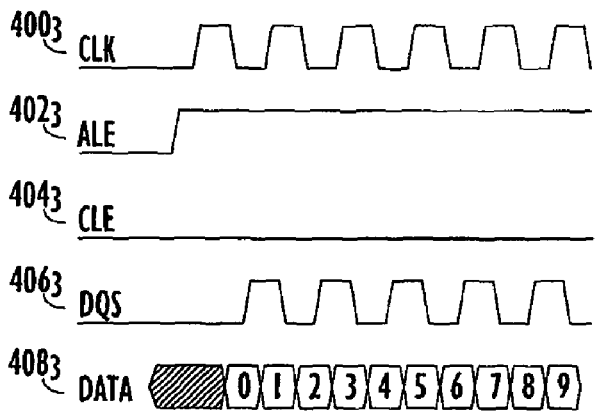

Examples of memory signals (e.g., control and/or data signals) 304 utilized by the DSR 354 according to one or more embodiments of the present disclosure are illustrated in FIGS. 4A-4C. For example, five signals are illustrated in each of FIGS. 4A-4C. Data waveform 408 illustrates a data stream that might be received on data bus 302 such as a 32 bit serial data stream, for example. Waveforms 400-406 of FIGS. 4A-4C illustrate signals which might be received as control signals 304, for example. However, various embodiments of the present disclosure are not limited to these signals. Additional embodiments might comprise more or less signals than those shown in FIGS. 4A-4C. For example, a signal indicative of whether to assign a valid state to data being latched might be comprised of a single signal generated by the control circuitry 270 in response to the one or more signals received by the memory device, such as the signals shown in FIGS. 4A-4C. The control circuitry 270 might then provide the signal to the DSR 254/354 indicating that the data being latched is valid. Additional embodiments might utilize a DSR wherein the DSR 354 receives signals such as those illustrated in FIGS. 4A-4C and performs a translation of the signals to determine the intended validity status of the received data being latched in the DSR data registers 310. This translation by the DSR 354 of the signals shown in FIGS. 4A-4C can be made by the DSR control circuitry 314, for example.

FIG. 4A illustrates a set of waveforms which might result in the data being latched in the DSR 254/354 to be marked as valid data. For example, the DSR 254/354 can be configured to assign a valid status to a particular validity bit if the ALE 402 and CLE 404 waveforms are both in a high state as shown in FIG. 4A, for example. Waveform sets shown in FIGS. 4B and 4C illustrate received control signals 304 that would indicate to the DSR 254/354 that data presently being latched in a particular data latch such as 310, is to be designated as invalid data and would also assign the appropriate validity status to the validity register 312 corresponding to the received data. For example, as shown in FIGS. 4B and 4C, the DSR might be configured to assign an invalid status whenever the ALE $402_{2,3}$ and CLE $404_{2,3}$ signals do not match. As multiple memory devices might be coupled to a common communications bus that might also be coupled to a host (e.g., processor), the host may not intend for continuous streams of data to be targeted for the same memory device. For example, the host may present a 32 bit data stream 408 on the common communications bus but only intend half of the data to be stored in one memory device, and the other half of the data to be stored in a different memory device. Thus, the host may drive the various control signals, such as ALE 402 and CLE 404 differently to different memory devices. Thus, memory devices according to various embodiments of the present disclosure can discern between data intended for that device and data that is not intended for that device and assign an appropriate validity status to the received data, for example.

Following the latching of data into the data registers 310 as shown in FIG. 3 and the assignment of a validity status 312 to the data residing in each data latch 310, the DSR 354 then shifts the latched data out of the DSR across a parallel data bus 306 (e.g., DSR output data bus) that is coupled (not shown) to the memory array of the memory device. According to at least one embodiment, this parallel data bus 306 is 32 bits wide corresponding to four, eight bit data registers 310 storing data such as illustrated by FIG. 3. According to this configuration, all of the data residing in each of the data registers 310 can be shifted out of the DSR 354 across each channel of the 32 bit wide parallel data bus 306 concurrently, for example. Additional embodiments utilizing a number of data registers different than four might comprise a parallel data bus 306 of different widths. For example, a DSR 354 configured with eight, sixteen bit data registers 310 might utilize a 128 bit wide parallel data bus 306 to couple the DSR 354 to the memory array, for example. The parallel data bus 306 may be directly connected to the memory array circuitry or intervening components may exist in the data pathway, such as signal buffers, for example.

In addition to the parallel data bus 306 coupling the DSR to the memory array, additional signals 308 are also output from the DSR 354. These additional signals 308 (e.g., DSR output validity bus) provide the validity data stored in the validity register 312 associated with each data register 310 as its data is being transmitted on the parallel data bus 306. For example, a device having four data registers 310 in the DSR might have a four-bit DSR output validity bus 308. Thus, each of the four bus channels of the DSR output validity bus 308 corresponds to an associated group of eight bus channels of the DSR output data bus 306. For example, if the first eight channels of the 32 bit wide parallel DSR output data bus 306 correspond to the Data0 register $310_1$, then as the data latched in that register is transmitted on the DSR output data bus 306, the associated DSR output validity bus 308 channel is driven at a level indicative of the validity bit set in the validity register $312_1$ associated with the Data0 $310_1$ register. Thus, for each group of eight channels of the parallel DSR output data bus 306 coupled to a particular data latch 310, there is an associated data validity channel of the DSR output validity bus 308 that provides the validity status of the data present on each group of eight channels of the 32 channel bus 306. Although shown as two separate busses, the DSR output data bus 306 and the DSR output validity bus 308 might be combined into a single parallel bus, for example. Groups of data output from the DSR 354 to be stored in the memory array are transmitted to additional circuitry of the memory device (e.g., memory array data cache circuitry) which either accepts (e.g., latches) the data or rejects the data based upon the associated data validity channel data accompanying the data output from the DSR. This is illustrated by way of reference to FIG. 5.

Figure 5:
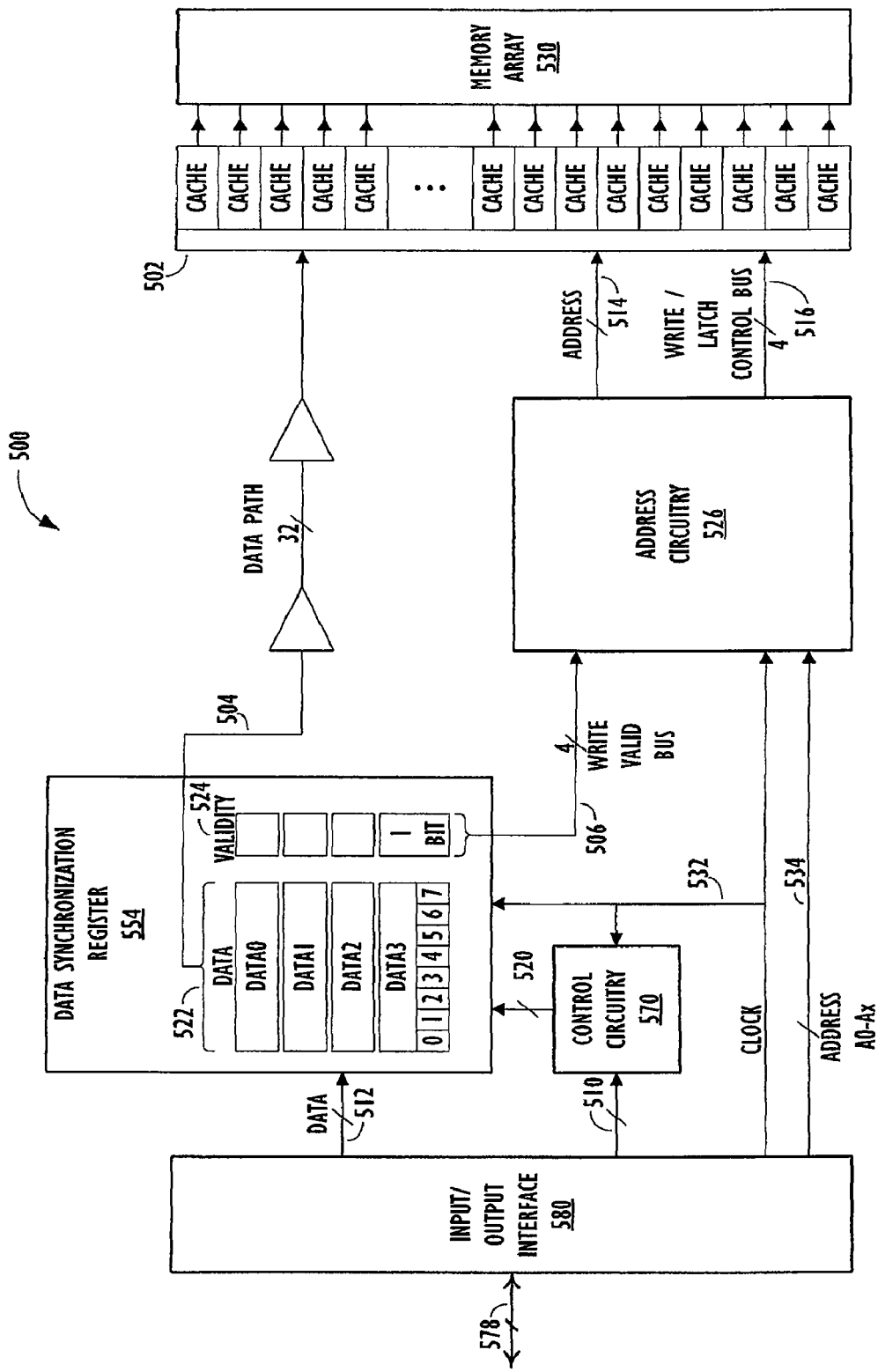
FIG. 5 is a functional block diagram of a portion of a memory device according to an embodiment of the present disclosure.

FIG. 5 illustrates a functional block diagram of a memory device 500 configured according to one or more embodiments of the present disclosure, such as memory device 200 shown in FIG. 2, for example. However, the memory device 500 shown in FIG. 5 has been simplified to improve readability of the figure and to focus on various elements according to one or more embodiments of the present disclosure. FIG. 5 illustrates a memory device 500 which includes an I/O interface 580 coupled to a communications bus 578 which might be coupled to other electronic devices, such as a processor and/or additional memory devices, for example. Control circuitry 570 is coupled to the interface 580 as well as the DSR 554 through a plurality of signal lines, 510 and 520, respectively. As discussed above, the control circuitry 570 might receive one or more control signals, such as a clock signal, DQS, ALE and CLE signals as discussed with respect to FIG. 4, along with other possible signals. Control circuitry 570 may pass one or more of the received control signals 510 on to the DSR 554 by way of signals 520. Control circuitry 570 might also generate additional signals utilized by the DSR 554, such as decoding one or more control signals 510 and generating a single control signal (e.g., data valid) 520 to be utilized by the DSR 554 instead of the DSR 554 performing the control signal decode operation with regard to determining a validity status of data latched in data latches 522, such as discussed above. FIG. 5 also illustrates additional signals such as clock signal 532 and address signals 534 which may be distributed throughout the memory device 500, for example.

DSR 554 shown in FIG. 5 is similar in configuration and functionality to the DSR 354 discussed with respect to FIG. 3. DSR 554 receives data from a data bus 512 coupled to the I/O interface 580. The data bus 512 is a serial data bus according to at least one embodiment of the present disclosure. DSR 554 is also shown as configured to handle four bytes of data utilizing data registers Data0-Data3 522 along with four data valid registers 524 wherein each data valid register is associated with one of the four data registers 522. Again however, DSR 554 according to various embodiments of the present disclosure is not limited to only handling four bytes of data as illustrated in FIG. 5.

FIG. 5 further illustrates a 32-bit parallel data bus 504 which couples the DSR 554 to the memory array data cache circuitry 502 similar to the DSR output data bus 306 discussed above. The memory array data cache circuitry 502 is shown in a simplified form in order to focus on elements helpful in understanding various embodiments of the present disclosure. Memory array data cache circuitry 502 might comprise one or a combination of two or more of the column decode circuitry 246, data register 248 and the data cache 250 as illustrated in FIG. 2, for example. Data bus 504 allows for data latched (e.g., serially latched) into the data registers 522 from the data bus 512 to be transferred in a parallel manner to the memory array cache circuitry 502. As discussed above, additional components may exist between the DSR 554 and the memory array cache circuitry 502, such as signal buffers, for example.

According to one or more embodiments of the present disclosure, the memory array cache circuitry 502 might have a capacity of 4 Kbytes. However, the memory array cache circuitry 502 is not limited to a capacity of 4 Kbytes. A memory device according to one or more embodiments of the present disclosure, might process four bytes of data at a time to be loaded into the 4000 byte capacity memory array data cache 502. Which of the four bytes of data that are ultimately latched into the memory array data cache 502 is dependent upon which of these four bytes of data transferred from the DSR 554 have a valid status associated with them.

A four-bit write valid data bus 506, similar to DSR output validity bus 308, is also output from the DSR 554 and couples the DSR to addressing circuitry 526. Addressing circuitry 526 provides control signals for the memory array cache circuitry 502 through the address bus 514 and the write/latch control bus 516. Data presented to the memory array cache circuitry 502 will only be latched into the memory array cache 502 if the data validity status associated with the presented data indicates it to be valid data and the addressing circuitry 526 initiates an appropriate write/latch control signal on the write/latch control bus 516. For example, following the capture of data in the data registers 522 of the DSR 554 and the assignment of a validity status for each data register 522, the data residing in the data registers 522 will be transferred across the 32 bit data bus 504 from the DSR 554 to the memory array cache circuitry 502. The validity status of each eight bits of data residing in each data register 522 is also provided to the address circuitry 526 by way of the four bit write valid bus 506. The address circuitry 526 generates four write/latch control signals 516 in response, at least in part, to the four data validity bits 524 associated with each byte of data on the 32 bit data bus 504. If a particular data valid status is valid then the address circuitry 526 generates a write/latch control signal enabling eight registers of the memory array cache circuitry 502 to latch the associated valid data on the data bus 504. If the validity status of a particular group of eight bits of data is invalid, the address circuitry 526 does not generate a write/latch control signal for those data lines of the 32 bit wide bus 504 transporting the invalid data. This results in the memory array cache circuitry 502 not latching (e.g., rejecting) the group of eight bits of invalid data received over the 32 bit data bus 504.

Following the latching of valid data in the memory array cache circuitry latches 502, the memory device 500 might perform a write operation of the data into the memory array 530 that was latched (e.g., data having a valid data status) in the memory array cache latches 502.

CONCLUSION

Memory devices and methods have been described capable of providing improved data handling in memory devices. By utilizing additional data to indicate a particular status of data groups inside the memory devices, efficient handling of data can be realized.

Although specific embodiments have been illustrated and described herein, it will be appreciated by those of ordinary skill in the art that any arrangement that is calculated to achieve the same purpose may be substituted for the specific embodiments shown. Many adaptations of the disclosure will be apparent to those of ordinary skill in the art. Accordingly, this application is intended to cover any adaptations or variations of the disclosure.

What is claimed is:

1. A memory device, comprising:
an interface configured to accept one or more data signals and one or more control signals;
an array of non-volatile memory cells;
a data cache coupled to the array of non-volatile memory cells;
a data synchronization register coupled to the data cache and to the interface, wherein the data synchronization register is configured to receive the one or more data signals accepted at the interface, latch the data signals into a particular number of data groups, designate a status of each data group at least partially in response to one or more of the control signals accepted at the interface, and transfer the data groups to the data cache; and
wherein the data cache is configured to latch each data group having a first designated status.

2. The memory device of claim 1, wherein the data cache is further configured to reject a data group if the designated status of the data group has a second designated status.

3. The memory device of claim 2, wherein the first designated status is indicative of a valid data status and the second designated status is indicative of an invalid data status.

4. The memory device of claim 1, wherein the data synchronization register is coupled to the interface by one of a parallel communications bus and a serial communications bus.

5. The memory device of claim 1, wherein the data synchronization register is coupled to the data cache by a parallel communications bus.

6. The memory device of claim 1, wherein the data synchronization register comprises one or more data registers each data register configured to store a particular number of bits of data.

7. The memory device of claim 6, wherein the data synchronization register comprises one or more validity registers where the number of validity registers equals the number of data registers.

8. The memory device of claim 7, wherein each validity register is associated with one data register.

9. The memory device of claim 7, wherein each validity register is configured to store one or more bit patterns where each of the one or more bit patterns is indicative of a data group status.

10. The memory device of claim 1, wherein the data synchronization register comprises control circuitry where the control circuitry is configured to receive one or more signals, determine a data group validity status of a first data group in response to the one or more signals and associate the determined data group validity status with the first data group.

11. A non-volatile memory device, comprising:
an interface, wherein the interface is configured to receive one or more data signals and one or more control signals from an external device;
an array of memory cells;
a data cache coupled to the array of memory cells;
a plurality of data registers, wherein each data register is configured to store a group of data bits;
a plurality of validity registers, wherein each validity register is associated with one of the plurality of data registers;
control circuitry, wherein the control circuitry is configured to receive one or more of the data signals and one or more of the control signals received at the interface from the external device, latch data signals comprising data into the plurality of data registers, generate a validity status value for data latched into each of the plurality of data registers at least partially in response to control signals received at the interface from the external device, store the generated validity status values in the plurality of validity registers and transfer groups of data stored in the plurality of data registers to the data cache; and
wherein the data cache is configured to selectively latch data transferred from the plurality of data registers into the data cache at least partially in response to the generated validity status values stored in the plurality of validity registers.

12. An electronic system, comprising:
a host, wherein the host is configured to generate one or more memory signals;
a memory device coupled to the host and configured to operate in response to the one or more memory signals, comprising:
an interface configured to accept one or more of the memory signals;
an array of non-volatile memory cells;
a data cache coupled to the array of non-volatile memory cells;
a data synchronization register coupled to the data cache and to the interface, wherein the data synchronization register is configured to receive the one or more memory signals accepted at the interface, latch memory signals comprising data into a particular number of data groups, designate a status of each data group at least partially in response to one or more of the memory signals accepted at the interface, and transfer the data groups to the data cache; and
wherein the data cache is configured to latch each transferred data group having a first designated status in the data cache and prevent each transferred data group having a second designated status from being latched in the data cache.

13. A method of handling data in a memory device, comprising:
receiving data at the memory device from a communications bus coupled between the memory device and an external device, wherein the communications bus comprises a plurality of channels;
grouping the received data into one or more groups of data, each group of data comprising data received on a plurality of the channels of the communications bus;
assigning a data validity status to each of the one or more data groups in response to control signals received at the memory device from the communications bus;
transferring the one or more data groups to a data cache; and
latching a transferred data group in the data cache if the data validity status assigned to the transferred data group has a first value.

14. The method of claim 13, further comprising preventing the data cache from latching a transferred data group if the data validity status assigned to the transferred data group has a second value.

15. The method of claim 14, wherein assigning the data validity status to each of the one or more data groups further comprises assigning one of a valid status and invalid status to each of the one or more data groups.

16. The method of claim 13, further comprising transferring data groups latched in the data cache to a memory array coupled to the data cache.

17. The method of claim 16, wherein transferring data groups latched in the data cache to the memory array coupled to the data cache further comprises writing the data groups latched in the data cache into the memory array.

18. A method of operating a memory device, comprising:
receiving one or more control signals at the memory device from a communications bus coupled to the memory device;
receiving data at the memory device from the communications bus for writing to the memory device;
grouping the received data into one or more data groups;
assigning a data group validity status to each of the one or more data groups wherein the validity status is assigned at least in part in response to the one or more of the received control signals;
transferring the one or more data groups to a data cache wherein the data cache is coupled to an array of memory cells; and
latching data groups having a first data group validity status into the data cache.

19. The method of claim 18, further comprising preventing data groups having a second data group validity status from being latched into the data cache.

20. The method of claim 18, further comprising performing a write operation of data groups latched into the data cache, wherein the write operation comprises writing the latched data into the array of memory cells.

21. The method of claim 18, wherein grouping received data into one or more data groups further comprises grouping received data into a particular number of data groups.

22. The method of claim 21, wherein receiving data from the communications bus further comprises receiving data from a serial communications bus.

23. The method of claim 22, wherein transferring the one or more data groups to the data cache further comprises transferring the one or more data groups to the data cache over a parallel data bus.

24. The method of claim 18, further comprising transferring each assigned validity status to the data cache concurrently with each of the one or more data groups.

25. The method of claim 18, wherein assigning the data group validity status further comprises assigning the data group validity status where a first assigned data group validity status is indicative of a valid data group validity status and a second assigned data group validity status is indicative of an invalid data group validity status.

26. The method of claim 13, wherein grouping the received data into one or more groups of data further comprises grouping the received data into one or more groups of data, each group of data comprising data received on less than all of the channels of the communications bus.

* * * * *